Dec. 1, 1953 A. C. LIES 2,660,796

DISK MEASURING DEVICE

Filed Nov. 24, 1950

Albert C. Lies
INVENTOR.

BY Clarence A. O'Brien
and Harvey B. Jacobson
Attorneys

Patented Dec. 1, 1953 2,660,796

UNITED STATES PATENT OFFICE 2,660,796

DISK MEASURING DEVICE

Albert C. Lies, Minneola, Kans.

Application November 24, 1950, Serial No. 197,382

4 Claims. (Cl. 33—143)

This invention relates to new and useful improvements and structural refinements in devices for measuring plow disks, and the principal object of the invention is to facilitate convenient and expeditious measurements of such disks, such as for example after grinding or sharpening, so that disks of a substantially same diameter may be replaced in a plow upon reconditioning.

Some of the advantages of the invention reside in its simplicity of construction, in its efficient and expeditious operation, in its adaptability to accommodate disks of various different diameters, and in its adaptability to economical manufacture.

With the above more important objects and features in view, and such other objects and features as may become apparent as this specification proceeds, the invention consists essentially of the arrangement and construction of parts as illustrated in the accompanying drawings, in which.

Like characters of reference are used to designate like parts in the specification and throughout the several views.

Figure 1:
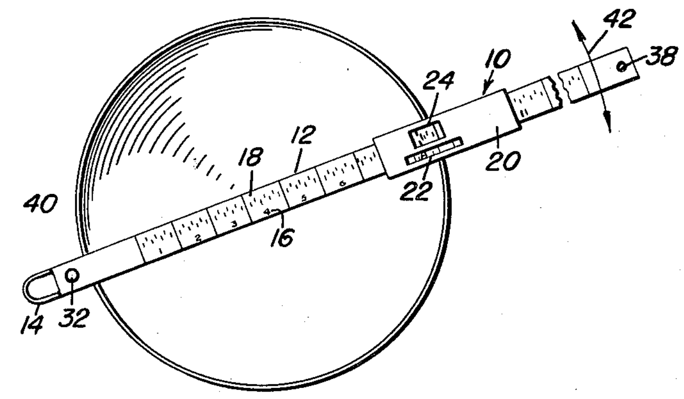
Figure 1 is a top plan view of the invention applied to a plow disk for measuring purposes.
Figure 2:
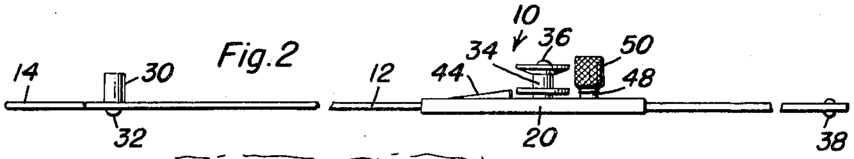
Figure 2 is a side elevational view of the invention per se.
Figure 3:
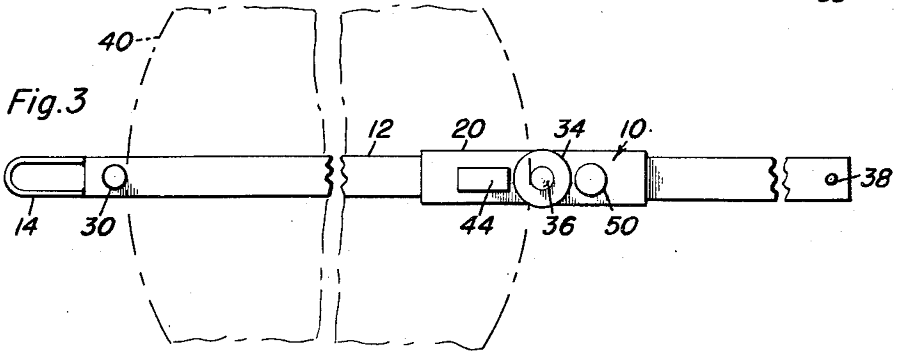
Figure 3 is an underside plan view of the subject shown in Figure 1, the disk being illustrated by dotted lines.

Referring now to the accompanying drawings in detail, the invention consists of a plow disk measuring device which is designated generally by the reference character 10 and embodies in its construction a graduated beam 12 which is provided at one end thereof with a loop-shaped handle 14, the latter also being intended for use in suspending the device from a support when the invention is not in operation.

The graduations on the beam 12 are preferably arranged in "inches" and "eighths of inches" as indicated at 16, 18, respectively, and a flat, tubular cursor 20 is slidable on the beam 12, toward and away from the handle 14, as will be clearly apparent.

The cursor 20 is provided with a pair of windows 22, 24 through which the respective graduations 16, 18 may be observed, particularly with respect to edges 26, 28 of the two windows which facilitate "reading" or taking of measurements.

A cylindrical fulcrum element or pin 30 is secured to the beam 12 by a rivet 32 adjacent the handle 14, while a gauging element 34, preferably assuming the form of a grooved roller, is rotatably mounted on the cursor 20 by a pin 36. A rivet 38 is provided at the remote end of the beam 12 to prevent the cursor 20 from sliding therefrom.

When the invention is placed in use, the fulcrum pin 30 is engaged with a point on the periphery of a plow disk 40, while the diametrically opposite peripheral portion of the disk is engaged with the grooved gauging roller 34, this being accomplished by abutting the pin 30 against the disk and oscillating the beam 12 in the directions of the arrows 42 (see Figure 1), so that a position is eventually reached when the pin 30 and the roller 34 engage the exact, diametrically opposite peripheral portions of the disk and "span" the greatest diameter thereof. This diameter may be readily determined by observing the graduations 16, 18 with respect to the edges 26, 28 of the openings 22, 24, in which manner accurate measuring is possible.

Since the plow disks 40 are generally convexo-concave, a wedge-shaped or tapered guide 44 is secured to the cursor 20 immediately adjacent the gauging roller 34, so as to guide the peripheral portion of the disk into the groove of the roller.

Figures 4, 5:
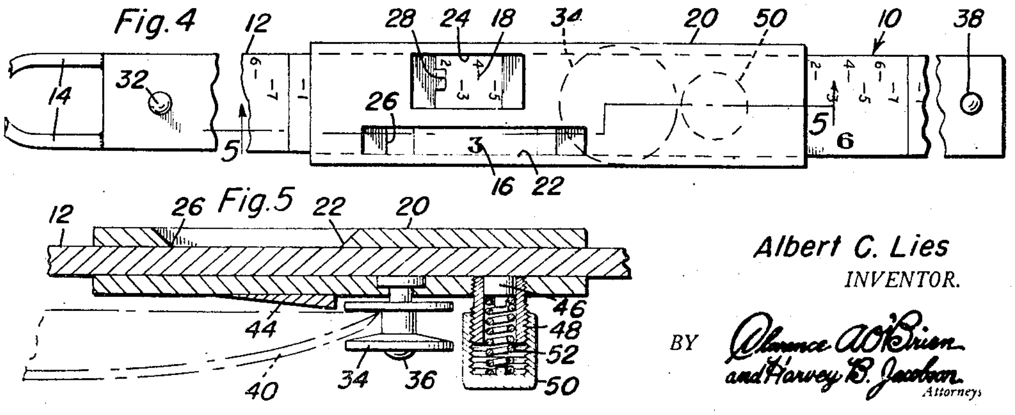
Figure 4 is a fragmentary top plan view of the invention per se on an enlarged scale.
Figure 5 is a fragmentary sectional detail, taken substantially in the plane of the line 5—5 in Figure 4.

In addition to the foregoing, means are provided for resisting free sliding movement of the cursor on the beam 12, these means simply consisting of a pressure exerting element 46 which is slidable in an externally screw-threaded, tubular housing 48 provided on the cursor 20, the housing 48 being equipped with a cap 50 which accommodates a compression spring 52, as is best shown in Figure 5. The spring 52 urges the element 46 in frictional engagement with the beam 12, so as to resist free sliding movement of the cursor 20 on the beam and thereby further assure accuracy of measurement.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. A disk measuring device, comprising a graduated beam, a fulcrum pin provided on one end portion of said beam to abut a point on a periphery of a disk to be measured, a cursor slidable on said beam toward and away from said fulcrum pin and provided with indicator means registrable with graduations on the beam, a gauging roller rotatably mounted on said cursor and provided with an annular groove for receiving a peripheral portion of the stated disk diametrically opposite to said fulcrum pin, and a tapered disk guide provided on said cursor adjacent said roller and having a relatively thick portion thereof in substantial alignment with said groove.

2. The device as defined in claim 1 together with spring-pressed means on said cursor for frictionally engaging said beam and resisting sliding of the cursor thereon.

3. A disk measuring device, comprising a graduated beam, a fulcrum element provided on one end of said beam to abut a single point on a periphery of a disk to be measured, a cursor slidable on said beam toward and away from said fulcrum element and provided with indicator means registrable with graduations on the beam, a single gauging element carried by said cursor for engaging a portion of the periphery of the disk substantially diametrically opposite the fulcrum contact point, said gauging element comprising a roller rotatably mounted on the cursor, and a guide element on said cursor adjacent said roller.

4. A disk measuring device, comprising a graduated beam, a fulcrum element provided on one end of said beam to abut a single point on a periphery of a disk to be measured, a cursor slidable on said beam toward and away from said fulcrum element and provided with indicator means registrable with graduations on the beam, a single gauging element carried by said cursor for engaging a portion of the periphery of the disk substantially diametrically opposite the fulcrum contact point, said gauging element comprising a roller rotatably mounted on the cursor and provided with an annular groove and a guide element on said cursor adjacent said roller.

ALBERT C. LIES.

References Cited in the file of this patent

UNITED STATES PATENTS

| Number | Name | Date |
|---|---|---|
| 297,056 | Bellows | Apr. 15, 1884 |
| 454,516 | Brown | June 23, 1891 |
| 639,671 | Smith | Dec. 19, 1899 |
| 1,540,969 | Walen et al. | June 9, 1925 |
| 1,603,808 | Schane | Oct. 19, 1926 |
| 1,886,416 | Williams | Nov. 22, 1932 |